(12) United States Patent
Kano et al.

(10) Patent No.: US 10,218,203 B2
(45) Date of Patent: Feb. 26, 2019

(54) CONTROL DEVICE FOR CONTROLLING CHARGING AND DISCHARGING OF A LITHIUM ION CAPACITOR

(71) Applicant: TOYOTA JIDOSHA KABUSHIKI KAISHA, Toyota-shi, Aichi-ken (JP)

(72) Inventors: Sa Kano, Toyota (JP); Ryuta Ishida, Toyota (JP); Yukinori Murakami, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/493,818

(22) Filed: Apr. 21, 2017

(65) Prior Publication Data

US 2017/0310123 A1 Oct. 26, 2017

(30) Foreign Application Priority Data

Apr. 25, 2016 (JP) ................. 2016-086702

(51) Int. Cl.
*H02J 7/00* (2006.01)
*B60L 11/18* (2006.01)
*H02J 7/34* (2006.01)

(52) U.S. Cl.
CPC ........... *H02J 7/007* (2013.01); *B60L 11/1809* (2013.01); *B60L 11/1861* (2013.01); *H02J 7/0063* (2013.01); *H02J 7/345* (2013.01); *H02J 2007/0067* (2013.01)

(58) Field of Classification Search
CPC .......... H02J 7/007; H02J 7/0063; H02J 7/345; H02J 2007/0067; B60L 11/1809; B60L 11/1861

See application file for complete search history.

(56) References Cited

U.S. PATENT DOCUMENTS

2014/0203738 A1 7/2014 Yamazaki
2016/0236581 A1* 8/2016 Tashiro ................. H02J 7/0029

FOREIGN PATENT DOCUMENTS

| JP | 2013-051115 A | 3/2013 |
| JP | 2014-158414 A | 8/2014 |
| JP | 2015-173201 A | 10/2015 |

\* cited by examiner

*Primary Examiner* — Daniel Kessie
(74) *Attorney, Agent, or Firm* — Sughrue Mion, PLLC

(57) ABSTRACT

There is provided a motor vehicle including a lithium ion capacitor; an electrical load configured to transmit electric power to and from at least the lithium ion capacitor; and a control device. The control device is programmed to control the lithium ion capacitor such as to be charged and discharged according to a discharging excess pattern that provides a higher discharge current value than a charging current value, when a degree of degradation of the lithium ion capacitor reaches or exceeds a predetermined level by charging and discharging the lithium ion capacitor according to a charging excess pattern that provides a higher charging current value than a discharge current value.

2 Claims, 4 Drawing Sheets

CONTROL DEVICE FOR CONTROLLING CHARGING AND DISCHARGING OF A LITHIUM ION CAPACITOR

This application claims priority to Japanese Patent Application No. 2016-086702 filed Apr. 25, 2016, the contents of which is incorporated herein by reference

TECHNICAL FIELD

The present disclosure relates to a motor vehicle and more specifically to a motor vehicle equipped with a lithium ion capacitor.

BACKGROUND

A proposed configuration of a lithium ion capacitor includes a positive electrode, a negative electrode containing a negative electrode active material serving to absorb and release lithium ion, and a non-aqueous electrolytic solution containing a lithium ion (as described in, for example, JP 2015-173201A). This lithium ion capacitor is expected to have a high discharge capacity and excellent safety when the lithium ion capacity is operated at low temperature or at high temperature.

CITATION LIST

Patent Literature

PTL 1: JP2015-173201

SUMMARY

Like a lithium ion battery, the lithium ion capacitor has deterioration of the increasing internal resistance by charging and discharging. Charging and discharging the lithium ion battery with a high current value is expected to cause an unevenness in the salt concentration in an in-plane direction in an electrolytic solution inside of the battery and thereby increase the internal resistance. It is known that leaving the degrading lithium ion battery for some time at the earlier timing or charging and discharging the degrading lithium ion battery with a low current at the earlier timing provides recovery from the degradation. Such technique of recovery from degradation of the lithium ion battery is, however, not employable for the lithium ion capacitor, since the lithium ion capacitor has a different configuration from that of the lithium ion battery.

The motor vehicle of the disclosure mainly aims to provide recovery from degradation of a lithium ion capacitor and provide sufficient performance of the lithium ion capacitor.

In order to achieve the object described above, the following aspects may be employed for the motor vehicle of the disclosure.

The vehicle of this aspect may include a lithium ion capacitor; an electrical load programmed to transmit electric power to and from at least the lithium ion capacitor; and a control device, wherein the control device is configured to control the lithium ion capacitor such as to be charged and discharged according to a discharging excess pattern that provides a higher discharge current value than a charging current value, when a degree of degradation of the lithium ion capacitor reaches or exceeds a predetermined level by charging and discharging the lithium ion capacitor according to a charging excess pattern that provides a higher charging current value than a discharge current value.

The inventors of the present disclosure have found that charging and discharging a lithium ion capacitor according to a charging excess pattern that provides a higher charging current value than a discharge current value increases the internal resistance of the lithium ion capacitor and causes degradation of the lithium ion capacitor. The inventors have also found that when the internal resistance of the lithium ion capacitor is increased by charging and discharging according to the charging excess pattern, charging and discharging the lithium ion capacitor according to a discharging excess pattern that provides a higher discharge current value than a charging current value decreases the internal resistance of the lithium ion capacitor and provides recovery from degradation. Based on such findings, when the degree of degradation of the lithium ion capacitor reaches or exceeds the predetermined level by charging and discharging the lithium ion capacitor according to the charging excess pattern, the motor vehicle of this aspect charges and discharges the lithium ion capacitor according to the discharging excess pattern. This provides recovery from degradation of the lithium ion capacitor. After recovery from degradation, the lithium ion capacitor provides sufficient performance. As a result, the motor vehicle of this aspect provides recovery from degradation of the lithium ion capacitor and provides sufficient performance of the lithium ion capacitor.

The "degree of degradation of the lithium ion capacitor" herein may be expressed by, for example, a degradation index obtained by integrating a parameter that is proportional to a charging current value from the state of charge of the lithium ion capacitor that is equal to or lower than a predetermined value (for example, 50%) and is attenuated with time.

DETAILED DESCRIPTION OF EMBODIMENTS

The following describes some aspects of the disclosure with reference to embodiment.

Figure 1:
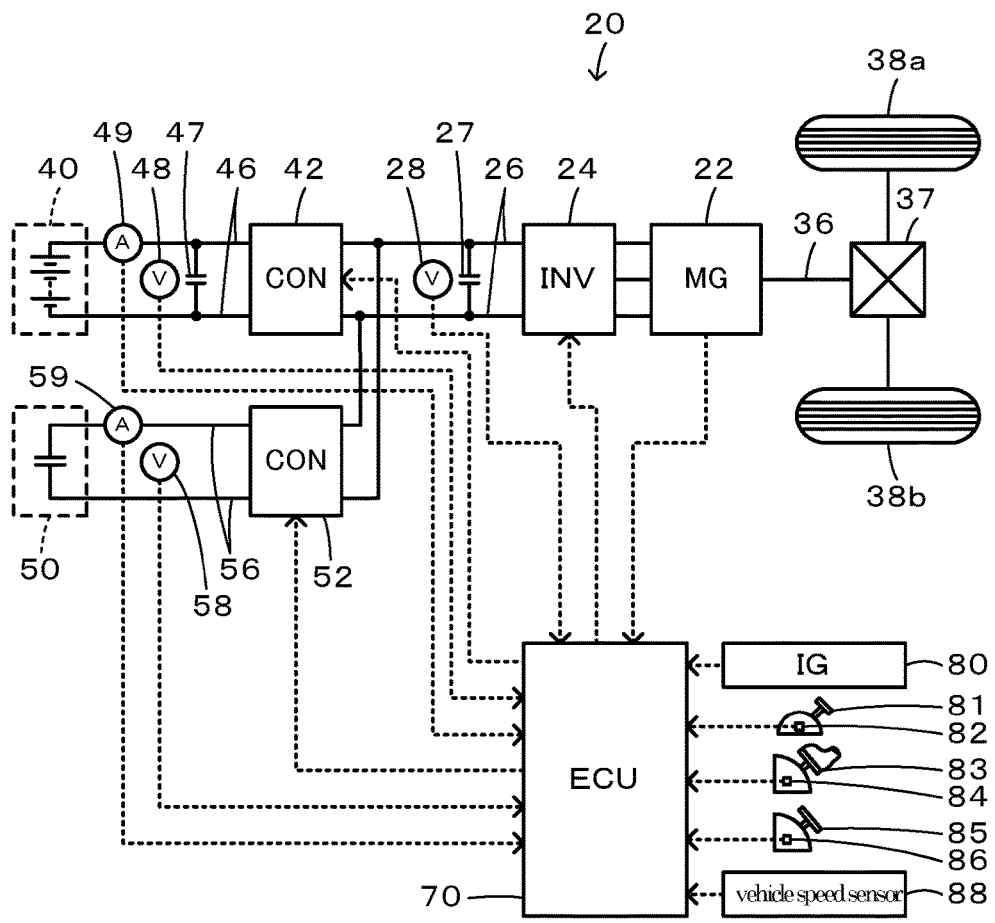
FIG. 1 is a configuration diagram schematically illustrating the configuration of an electric vehicle 20 according to one embodiment of the disclosure.

FIG. 1 is a configuration diagram schematically illustrating the configuration of an electric vehicle 20 according to one embodiment of the invention. As illustrated, the electric vehicle 20 of this embodiment includes a motor 22 for driving, an inverter 24 configured to drive the motor 22, a battery 40, a first boost-up converter 42, a lithium ion capacitor 50, a second boost-up converter 52 and an electronic control unit 70.

The motor 22 may be configured by, for example, a synchronous motor generator including a rotor with permanent magnets embedded therein and a stator with three-phase coils wound thereon. The rotor of the motor 22 is connected with a driveshaft 36 that is linked with drive wheels 38a and 38b via a differential gear 37.

The inverter 24 is connected with drive-side power lines 26 and with the three-phase coils (U phase, V phase and W phase) of the motor 22 and is configured to convert a DC power of the drive-side power lines 26 into a three-phase AC power and apply the three-phase AC power to the motor 22. The inverter 24 is configured as a known inverter circuit including six transistors and six diodes. A smoothing capacitor 27 is mounted to the drive-side power lines 26.

The battery 40 may be configured by, for example, a lithium ion battery or a nickel metal hydride battery and is connected with battery-side power lines 46. The first boost-up converter 42 is connected with the battery-side power lines 46 which the battery 40 is connected with, and with the drive-side power lines 26 which the inverter 24 is connected with. This first boost-up converter 42 is configured as a known boost-up converter including two transistors, two diodes and a reactor. The first boost-up converter 42 is configured to boost up the power of the battery-side power lines 46 and supply the boosted-up power to the drive-side power lines 26 and to boost down the power of the drive-side power lines 26 and supply the boosted-down power to the battery-side power lines 46. A smoothing capacitor 47 is mounted to the battery-side power lines 46.

The lithium ion capacitor 50 may be configured by, for example, a known lithium ion capacitor including a positive electrode, a negative electrode that contains a negative electrode active material configured to absorb and release lithium ion, and anon-aqueous electrolytic solution containing a lithium salt. The second boost-up converter 52 is connected with capacitor-side power lines 56 which the lithium ion capacitor 50 is connected with, and with the drive-side power lines 26 which the inverter 24 is connected with. This second boost-up converter 52 is configured as a known boost-up converter including two transistors, two diodes and a reactor. The second boost-up converter 52 is configured to boost up the power of the capacitor-side power lines 56 and supply the boosted-up power to the drive-side power lines 26 and to boost down the power of the drive-side power lines 26 and supply the boosted-down power to the capacitor-side power lines 56.

The electronic control unit 70 is configured as a CPU-based microprocessor and includes a ROM configured to store processing programs, a RAM configured to temporarily store data and input/output ports, in addition to the CPU, although not being illustrated. The electronic control unit 70 receives signals input from various sensors via the input port: for example, a rotational position of the rotor of the motor 22 from a rotational positions sensor (not shown) configured to detect the rotational position; and phase currents from a current sensor (not shown) mounted to the three phases (U phase, V phase and W phase) of the motor 22. The electronic control unit 70 also receives other inputs via the input port: for example, an ignition signal from an ignition switch 80, a shift position SP from a shift position sensor 82 configured to detect the operating position of a shift lever 81. The electronic control unit 70 further receives other inputs via the input port: for example, an accelerator position Acc from an accelerator pedal position sensor 84 configured to detect the driver's depression amount of an accelerator pedal 83; a brake pedal position BP from a brake pedal position sensor 86 configured to detect the driver's depression amount of a brake pedal 85; and a vehicle speed V from a vehicle speed sensor 88. The electronic control unit 70 additionally receives other inputs via the input port: for example, a drive-side voltage VH from a voltage sensor 28 mounted to the drive-side power lines 26; a battery-side voltage VB from a voltage sensor 48 mounted to the battery-side power lines 46; a capacitor-side voltage VC from a voltage sensor 58 mounted to the capacitor-side power lines 56; a battery current Ib from a current sensor 49 mounted to the battery-side power lines 46; and a capacitor current Ic from a current sensor 59 mounted to the capacitor-side power lines 56. The electronic control unit 70 outputs, via the output port, for example, switching control signals to the six transistors of the inverter 24, switching control signals to the two transistors of the first boost-up converter 42 and switching control signals to the two transistors of the second boost-up converter 52.

The electronic control unit 70 computes a rotation speed Nm of the motor 22, based on the rotational position of the rotor of the motor 22. The electronic control unit 70 also computes a state of charge SOC(b) of the battery 40, based on an integrated value of the battery current Ib from the current sensor 49, and computes a state of charge SOC(c) of the lithium ion capacitor 50, based on an integrated value of the capacitor current Ic from the current sensor 59. The electronic control unit 70 additionally computes input and output limits Win(b) and Wout(b) as allowable maximum values of electric power chargeable into and dischargeable from the battery 40, based on the state of charge SOC(b) and a battery temperature, and computes input and output limits Win(c) and Wout(c) as allowable maximum values of electric power chargeable into and dischargeable from the lithium ion capacitor 50, based on the state of charge SOC(c) and a capacitor temperature.

The electronic control unit 70 also performs drive control to drive the motor 22, based on the driver's depression amount of the accelerator pedal 83. The procedure of drive control first sets a required power Pd* that is required for the driveshaft 36, based on the depression amount of the accelerator pedal 83 (accelerator position Acc) detected by the accelerator pedal position sensor 84 and the vehicle speed V detected by the vehicle speed sensor 88. The procedure of drive control subsequently determines fractions (distribution coefficients) k1 and k2 (k2=1−k1) of an electric power to be distributed to the battery 40 and an electric power to be distributed to the lithium ion capacitor 50 out of the required power Pd*, based on the state of charge SOC(b) of the battery 40 and the state of charge SOC(c) of the lithium ion capacitor 50. The procedure of drive control then controls the second boost-up converter 52 such that an electric power (k2·Pd*) obtained by multiplying the required power Pd* by the distribution coefficient k2 is output from (or input into) the lithium ion capacitor 50 within a range of the input limit Win(c) and the output limit Wout(c) of the lithium ion capacitor 50, while controlling the first boost-up converter 42 such that an electric power obtained by subtracting the electric power input into or output from the lithium ion capacitor 50 from the required power Pd* is output from (or input into) the battery 40. The procedure of drive control controls the inverter 24 to cause a required torque Tm* obtained by dividing the required power Pd* by the motor rotation speed Nm to be output from the motor 22, simultaneously with such control of the first boost-up converter 42 and the second boost-up converter 52.

Figure 2:
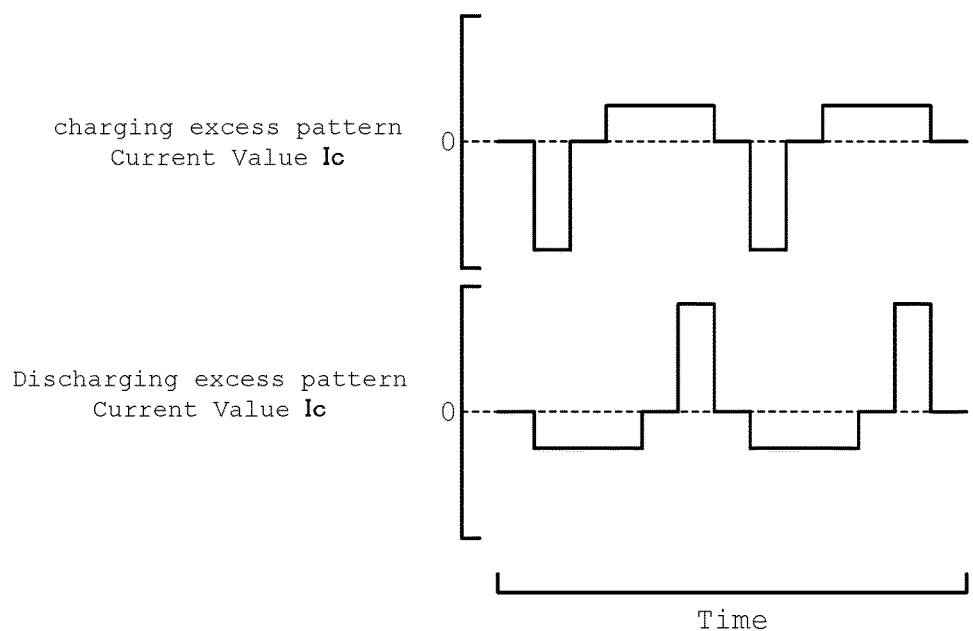
FIG. 2 is a diagram schematically illustrating charge-discharge patterns.
Figure 3:
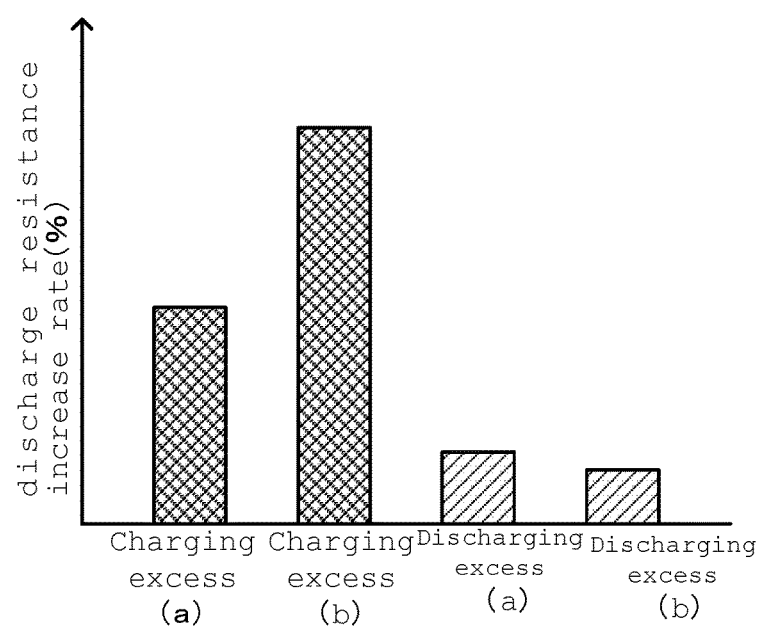
FIG. 3 is a diagram showing one example of relationship of discharge resistance increase rate to charge-discharge pattern.
Figure 4:
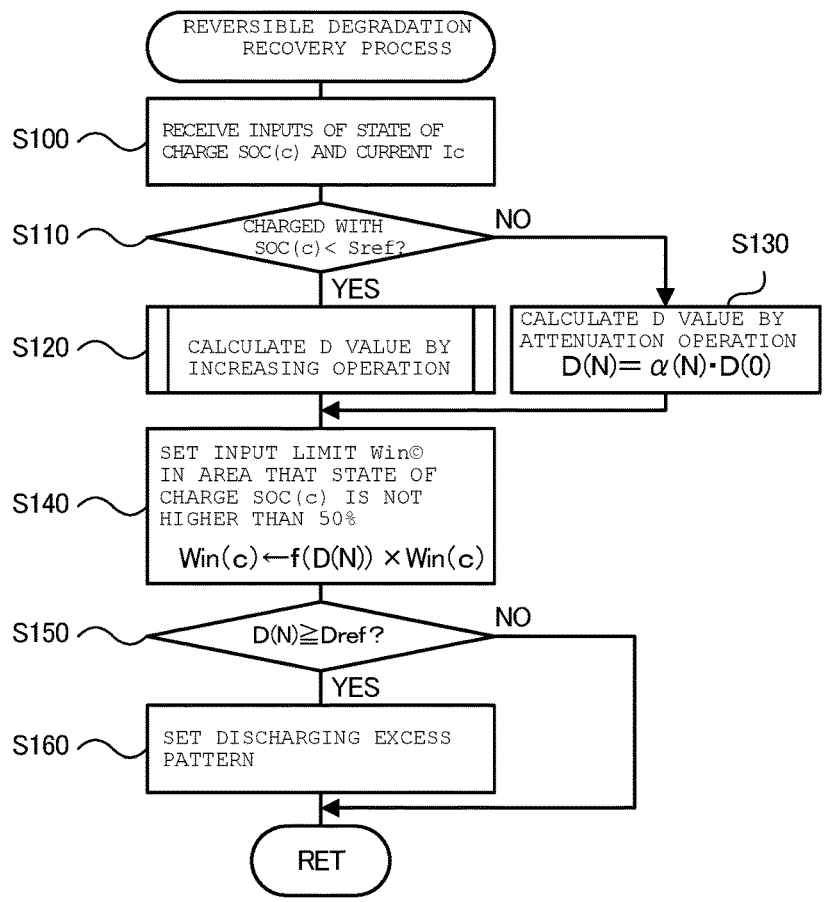
FIG. 4 is a flowchart showing one example of a reversible degradation recovery process performed by an electronic control unit 70.

The following describes the operations of the electric vehicle 20 of the embodiment having the above configuration or more specifically a series of operations with regard to reversible degradation of the lithium ion capacitor 50. The lithium ion capacitor 50 has been observed to increase the internal resistance when the lithium ion capacitor 50 is charged and discharged according to a charging excess pattern that provides higher charging current values than discharge current values. The lithium ion capacitor 50 has also been observed to decrease the internal resistance when the lithium ion capacitor 50 having the increased internal resistance is charged and discharged according to a discharging excess pattern that provides higher discharge current values than charging current values. FIG. 2 schematically illustrates charge-discharge patterns. FIG. 3 shows one example of relationship of discharge resistance increase rate to charge-discharge pattern. As shown in FIG. 2, the charging excess pattern is configured to repeat rapid charging with high charging current values and slow discharging with low discharge current values. The discharging excess pattern is configured to repeat slow charging with low charging current values and rapid discharging with high discharge current values. An actual charge-discharge pattern is, however, not simply expressible by such schematic patterns but may be configured as a mixture of charging excess patterns and discharging excess patterns. In this case, it is determined whether the charging excess patterns are dominant or the discharging excess patterns are dominant, depending on the driver's use conditions. In FIG. 3, a charging excess pattern (a) denotes a charging dominant pattern with medium charging current values, and a charging excess pattern (b) denotes a charging dominant pattern with high charging current values. A discharging excess pattern (a) denotes a discharging dominant pattern with medium discharge current values, and a discharging excess pattern (b) denotes a discharging dominant pattern with high discharge current values. As shown in FIG. 3, the charging excess pattern provides a higher discharge resistance increase rate compared with the discharging excess pattern. The discharge resistance increase rate increases with an increase in the charging current value. These results indicate that degradation of the lithium ion capacitor 50 is accelerated by charging and discharging the lithium ion capacitor 50 according to the charging excess pattern and that the lithium ion capacitor 50 is recovered from degradation by charging and discharging the lithium ion capacitor 50 according to the discharging excess pattern. In the description hereof, degradation by this phenomenon is called "reversible degradation". In the electric vehicle 20 of the embodiment, in order to provide sufficient performance of the lithium ion capacitor 50, the electronic control unit 70 performs a reversible degradation recovery process shown in FIG. 4. The following describes this reversible degradation recovery process.

On a start of the reversible degradation recovery process, the electronic control unit 70 first receives the inputs of the state of charge SOC(c) and the capacitor current Ic of the lithium ion capacitor 50 (step S100) and determines whether the lithium ion capacitor 50 with the state of charge SOC(c) of lower than a reference value Sref is charged (step S110). The reference value Sref may be an upper limit value of a charge start SOC at which reversible degradation is observed by charging and discharging according to the charging excess pattern or a value close to the upper limit value (for example, 50% or 40%). When the lithium ion capacitor 50 with the state of charge SOC(c) of lower than the reference value Sref is charged, the electronic control unit 70 calculates a D value that indicates the degree of reversible degradation, according to Equation (1) given below (step S120). In Equation (1), D (N) and D (0) denote D value, α (N) and α (k) denote a forgetting factor, β denotes a current coefficient, c0 denotes a threshold limit value, and Δt denotes a very short time period. The forgetting factor α (N) and α (k) and the current coefficient β are determined according to the material of the lithium ion capacitor 50, and the threshold limit value c0 is determined according to the remaining capacity and the temperature of the lithium ion capacitor 50. As understood from Equation (1), the D value is given as an integrated value of a term proportional to the capacitor current Ic and is attenuated with time. When the state of charge SOC(c) is equal to or higher than the reference value Sref or when the lithium ion capacitor 50 with the state of charge SOC(c) of lower than the reference value Sref is discharged, on the other hand, the electronic control unit 70 multiplies the present D value by the forgetting factor α to calculate a new D value (step S130). The D value is increased with an increase in the charging current value (capacitor current Ic) when the lithium ion capacitor 50 with the state of charge SOC(c) of lower than the reference value Sref is charged. The D value is attenuated, on the other hand, when the state of charge SOC(c) is equal to or higher than the reference value Sref or when the lithium ion capacitor 50 is discharged. The state that provides a large D value is thus expected as the state that the charging excess patterns are dominant.

[Math. 1]

$$D(N) = \alpha(N) * D(0) + \sum_{k=0}^{N-1} \alpha(k) \times \frac{\beta}{c0} \times Ic \times \Delta t \qquad (1)$$

Figure 5:
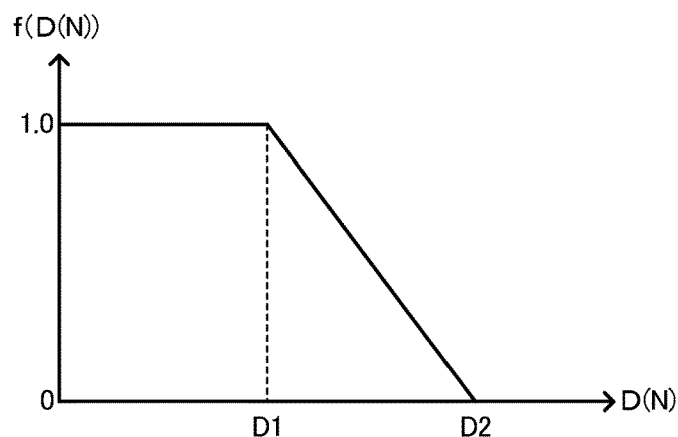
FIG. 5 is a diagram illustrating one example of a correction factor setting map.
Figure 6:
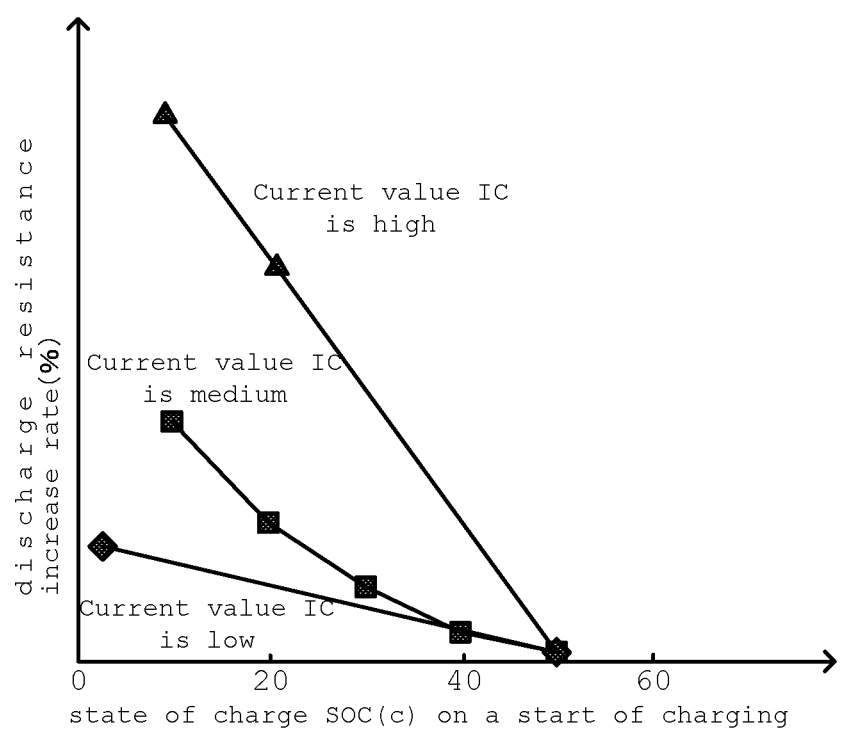
FIG. 6 is a graph showing one example of relationship of discharge resistance increase rate to capacitor current Ic and state of charge SOC(c) on a start of charging a lithium ion capacitor 50.

The electronic control unit 70 subsequently multiplies the input limit Win(c) in an area that the state of charge SOC(c) of the lithium ion capacitor 50 is equal to or lower than 50% by a correction factor f(D(N)) that is determined according to the D value and thereby sets a new input limit Win(c) in the area that the state of charge SOC(c) is equal to or lower than 50% (step S140). The correction factor f(D(N)) may be determined, for example, to start decreasing from a value 1 at the D value of greater than a value D1 and reach a value zero at a value D2, as shown in a correction factor setting map of FIG. 5. Charging the lithium ion capacitor 50 having the state of charge SOC(c) of not higher than 50% increases the internal resistance of the lithium ion capacitor 50 and accelerates the reversible degradation. Imposing a further limit on the input limit Win(c) in the area that the state of charge SOC(c) of the lithium ion capacitor 50 is equal to or lower than 50% aims to suppress such acceleration of the reversible degradation. FIG. 6 is a graph showing one example of relationship of the discharge resistance increase rate to the capacitor current Ic and the state of charge SOC(c) on a start of charging the lithium ion capacitor 50. As illustrated, the discharge resistance increase rate increases with a decrease in the state of charge SOC(c) on a start of charging the lithium ion capacitor 50, and also increases with an increase in the capacitor current Ic. Imposing a further limit on the input limit Win(c) in the area that the state of charge SOC(c) of the lithium ion capacitor 50 is equal to or lower than 50% accordingly suppresses acceleration of the reversible degradation.

The electronic control unit 70 subsequently determines whether the D value is equal to or greater than a reference value Dref (step S150). The reference value Dref may be determined experimentally or otherwise as a D value that allows for recovery from the reversible degradation of the lithium ion capacitor 50 by charging and discharging according to the discharging excess pattern. When the D value is smaller than the reference value Dref, the electronic control unit 70 determines that there is no need for recovery from the reversible degradation and terminates this process. When the D value is equal to or greater than the reference value Dref, on the other hand, the electronic control unit 70 determines that the charging excess patterns are dominant to accelerate the reversible degradation and that there is a need for recovery from the reversible degradation. The electronic control unit 70 accordingly provides the setting such that the lithium ion capacitor 50 is charged and discharged according to the discharging excess pattern (step S160) and then terminates this process. More specifically, charging and discharging the lithium ion capacitor 50 according to the discharging excess pattern may be performed as described below. In the case of discharging the lithium ion capacitor 50 based on the required power Pd*, the distribution coefficients k1 and k2 are regulated such as to output a power determined by limiting the required power Pd* with the output limit Wout(c) from the lithium ion capacitor 50 and to output a remaining power from the battery 40, and the lithium ion capacitor 50 and the battery 40 are driven and controlled with these regulated distribution coefficients k1 and k2, until the state of charge SOC(c) of the lithium ion capacitor 50 reaches a predetermined value (for example, 30% or 40%). In the case of charging the lithium ion capacitor 50 based on the required power Pd*, on the other hand, the distribution coefficients k1 and k2 are regulated such as to charge the lithium ion capacitor 50 with the smaller between a predetermined low charging current value and the input limit Win(c) and to charge the battery 40 with a remaining power, and the lithium ion capacitor 50 and the battery 40 are driven and controlled with these regulated distribution coefficients k1 and k2. This drive control causes the lithium ion capacitor 50 to be charged and discharged according to the discharging excess pattern and thereby provides recovery from the reversible degradation.

In the electric vehicle 20 of the embodiment described above, when the D value indicating the degree of the reversible degradation of the lithium ion capacitor 50 reaches or exceeds the reference value Dref by charging and discharging the lithium ion capacitor 50 according to the charging excess pattern, the lithium ion capacitor 50 is charged and discharged according to the discharging excess pattern. This configuration provides recovery from the reversible degradation of the lithium ion capacitor 50. This results in ensuring sufficient performance of the lithium ion capacitor 50. A further limit is imposed on the input limit Win(c) by multiplying the input limit Win(c) of the lithium ion capacitor 50 having the state of charge SOC(c) of not higher than 50% by the correction factor f(D(N)) that is decreased with an increase in the D value of not less than the value D1. This configuration suppresses acceleration of the reversible degradation of the lithium ion capacitor 50. Imposing a further limit on the input limit Win(c) of the lithium ion capacitor 50 having the state of charge SOC(c) of not higher than 50% is less likely to provide the charging excess pattern but is more likely to provide the discharging excess pattern. This is likely to provide recovery from the reversible degradation before the D value reaches the reference value Dref. As a result, this configuration further provides the higher performance of the lithium ion capacitor 50.

According to the electric vehicle 20 of the embodiment, a further limit is imposed on the input limit Win(c) by multiplying the input limit Win(c) of the lithium ion capacitor 50 having the state of charge SOC(c) of not higher than 50% by the correction factor f(D(N)) that is based on the D value. According to another modification, no further limit may be imposed on the input limit Win(c) of the lithium ion capacitor 50 having the state of charge SOC(c) of not higher than 50%.

According to the electric vehicle 20 of the embodiment, the battery 40 and the lithium ion capacitor 50 are mounted on the electric vehicle 20. According to a modification, two or more batteries and lithium ion capacitors may be mounted on a vehicle.

According to the electric vehicle 20 of the embodiment, the driving power of the motor 22 is supplied from the battery 40 and the lithium ion capacitor 50. According to a modification, the electric power from the lithium ion capacitor 50 may be supplied to an electrical load other than the motor 22.

According to the electric vehicle 20 of the embodiment, the battery 40 and the lithium ion capacitor 50 are connected with one identical power system. According to a modification, the battery 40 and the lithium ion capacitor 50 may be connected with separate power systems. In this modification, like the embodiment described above, when the D value indicating the degree of the reversible degradation of the lithium ion capacitor by the charging excess pattern reaches or exceeds the reference value Dref, charging and discharging the lithium ion capacitor according to the discharging excess pattern provides recovery from the reversible degradation.

the control device of this aspect may be configured to regulate fractions of charge-discharge power of the lithium ion capacitor and charge-discharge power of the at least one battery out of a required power, such as to charge and discharge the lithium ion capacitor according to the discharging excess pattern. The motor vehicle of this aspect provides recovery from degradation of the lithium ion capacitor without affecting driving of the electrical load.

The control device of this aspect may be configured to control the lithium ion capacitor such as to limit charging of the lithium ion capacitor having a state of charge that is equal to or lower than a predetermined value when the degree of degradation is high, compared with when the degree of degradation is low. The motor vehicle of this aspect suppresses acceleration of degradation of the lithium ion capacitor. Imposing such a limit is likely to provide the discharging excess pattern as the charge-discharge pattern. This is likely to provide recovery from degradation before the degree of degradation reaches or exceeds the predetermined level. As a result, this configuration further provides the higher performance of the lithium ion capacitor. The "predetermined value" may be, for example, 50% or 40%.

According to the electric vehicle 20 of the embodiment, the lithium ion capacitor 50 is charged and discharged with the electric power input from and output to the motor 22. According to a modification, the lithium ion capacitor may be discharged to supply electric power to an electrical load other than the motor or the lithium ion capacitor may be charged with electric power supplied from an electrical device other than the motor.

According to the embodiment, the lithium ion capacitor 50 is mounted on the electric vehicle. According to a modification, the lithium ion capacitor 50 may be mounted on an automobile that is not driven with a motor.

The following describes the correspondence relationship between the primary elements of this embodiment and the primary elements of the disclosure described in Summary. The lithium ion capacitor 50 of the embodiment corresponds to the "lithium ion capacitor". The motor 22 corresponds to the "electrical load". The first boost-up converter 42, the second boost-up converter 52 and the electronic control unit 70 correspond to the "control device".

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The present disclosure is applicable to the manufacturing industries of vehicle.

The invention claimed is:

1. An electrical system for a motor vehicle, comprising:
   a lithium ion capacitor;
   an electrical load configured to transmit electric power to and from at least the lithium ion capacitor; and
   a controller, wherein
   the controller is programmed to:
      detect that a degree of degradation of the lithium ion capacitor reaches or exceeds a predetermined level as a result of charging and discharging the lithium ion capacitor according to a charging excess pattern that provides a higher charging current value than a discharge current value,
      control the lithium ion capacitor to be charged and discharged according to a discharging excess pattern that provides a higher discharge current value than a charging current value, when the degree of degradation of the lithium ion capacitor reaches or exceeds the predetermined level, and
      control the lithium ion capacitor to limit charging of the lithium ion capacitor to a state of charge that is equal to or lower than a predetermined value, based on the degree of degradation.

2. The electrical system for a motor vehicle according to claim 1, further comprising:
   at least one battery configured to transmit electric power to and from the electrical load, wherein
   the controller is programmed to regulate fractions of charge-discharge power of the lithium ion capacitor and charge-discharge power of the at least one battery out of a required power, to charge and discharge the lithium ion capacitor according to the discharging excess pattern, when the degree of degradation reaches or exceeds the predetermined level.

* * * * *